US006613867B2

(12) United States Patent
Sonnenschein et al.

(10) Patent No.: US 6,613,867 B2
(45) Date of Patent: Sep. 2, 2003

(54) THERMOPLASTIC POLYURETHANE CONTAINING STRUCTURAL UNITS OF ETHYLENE OXIDE POLYOL OR ETHYLENE OXIDE CAPPED PROPYLENE OXIDE POLYOL

(75) Inventors: Mark F. Sonnenschein, Midland, MI (US); Mark Cox, Houston, TX (US); Paul J. Moses, Jr., Lake Jackson, TX (US); Christopher P. Christenson, Lake Jackson, TX (US); Benjamin L. Wendt, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/005,444

(22) Filed: Dec. 5, 2001

(65) Prior Publication Data

US 2002/0123601 A1 Sep. 5, 2002

Related U.S. Application Data

(60) Provisional application No. 60/256,883, filed on Dec. 19, 2000.

(51) Int. Cl.$^7$ ................................................ C08G 18/48
(52) U.S. Cl. ........................................... 528/76; 528/79
(58) Field of Search ..................................... 528/76, 79

(56) References Cited

U.S. PATENT DOCUMENTS

| 4,202,957 A | 5/1980 | Bonk et al. ................... 528/77 |
| 4,239,879 A | 12/1980 | Fabris et al. ................... 528/76 |
| 4,243,760 A | 1/1981 | McDaniel et al. ........... 521/176 |
| 4,371,684 A | 2/1983 | Quiring et al. ................ 528/65 |
| 4,385,133 A | 5/1983 | Alberino et al. ............. 521/159 |
| 4,522,975 A | 6/1985 | O'Connor et al. ........... 524/702 |
| 4,525,491 A | 6/1985 | Narisawa et al. ............ 521/174 |
| 5,167,899 A | 12/1992 | Jezic ........................... 264/510 |
| 5,334,691 A | * 8/1994 | Gould et al. |
| 5,545,708 A | 8/1996 | Onwunaka et al. ........... 528/76 |

FOREIGN PATENT DOCUMENTS

| EP | 0408201 | 1/1991 |
| JP | 57199650 | 12/1982 |
| JP | 2000327735 | 11/2000 |

* cited by examiner

*Primary Examiner*—Rachel Gorr

(57) ABSTRACT

The present invention is a thermoplastic polyurethane (TPU) or thermoplastic polyurethane/urea (TPUU) comprising structural units of: a) a diisocyanate; b) ethylene glycol, diethylene glycol, or 1,3-propanediol; c) a diol, a diamine, or an amino alcohol different from the one selected in (b) and having a molecular weight of less than 400 Daltons; and (d) ethylene oxide polyol or ethylene oxide-capped propylene oxide polyol. The TPU or TPUU has low temperature flexibility, high moisture vapor transition rates, and is considerably less expensive than state-of-the-art TPUs or TPUUs. The preferred composition is a TPU that is substantially free of phase segregation, and consequently has clarity and tensile strength not known for TPUs prepared using ethylene oxide polyol or ethylene oxide-capped propylene oxide polyol.

13 Claims, No Drawings

THERMOPLASTIC POLYURETHANE CONTAINING STRUCTURAL UNITS OF ETHYLENE OXIDE POLYOL OR ETHYLENE OXIDE CAPPED PROPYLENE OXIDE POLYOL

CROSS-REFERENCE STATEMENT

This application claims the benefit of U.S. Provisional Application No. 60/256,883, filed Dec. 19, 2000.

BACKGROUND OF THE INVENTION

This invention relates to a phase segregated thermoplastic polyurethane (TPU) that contains structural units formed from ethylene oxide polyol (EO) or ethylene oxide-capped polypropylene oxide polyol (EO-PO). For low temperature flexibility, high moisture vapor transition rates (MVTR), and low cost, it would be desirable to use EO or EO-PO for the preparation of a TPU. Historically, however, it has been observed that EO and EO-PO produce a TPU with substantial phase segregation and resultant undesirable opacity and low tensile strength. Thus, if EO or EO-PO are used at all, they are used in combination with polyester polyols or polytetramethylene ether glycol (PTMEG) to produce a TPU with improved phase compatibility and therefore improved clarity and strength. However, polyester polyols diminish low temperature flexibility, while PTMEG attenuates MVTR. Accordingly, it would be an improvement in the art to discover an EO- or EO-PO-based TPU that has high tensile strength and clarity.

SUMMARY OF THE INVENTION

The present invention addresses the deficiencies in the art by providing a thermoplastic polyurethane (TPU) or thermoplastic polyurethane/polyurea (TPUU) comprising structural units of:

a) a diisocyanate;
b) a first chain extender selected from the group consisting of ethylene glycol, diethylene glycol, and 1,3-propanediol;
c) a second chain extender selected from the group consisting of a diol, a diamine, and an amino alcohol and having a molecular weight of less than 400 Daltons, with the proviso that the first chain extender is different from the second chain extender; and
d) ethylene oxide polyol or ethylene oxide-capped propylene oxide polyol;

wherein the thermoplastic polyurethane or polyurethane/urea has a melting point of not less than 120° C. and not more than 230° C., a Shore D hardness of not more than 75 and/or a $T_g$ of less than 25° C., and a total optical transmission rate of at least 50 percent and/or a tensile strength of at least 800 psi.

DETAILED DESCRIPTION OF THE INVENTION

As used herein, the term structural unit refers to a remnant of a reactant used to prepare the TPU or TPUU. For example, a structural unit of a diisocyanate is represented by the following formula:

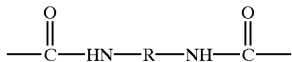

where R is an alkylene, cycloalkylene, or arylene group.

A structural unit of ethylene glycol is represented by the following formula:

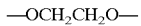

A structural unit of diethylene glycol is represented by the following formula:

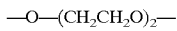

A structural unit of hydroquinone dimethanol is represented by the following structure:

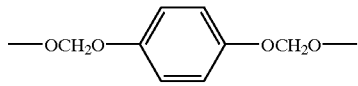

A structural unit of ethylene oxide polyol is represented by the following formula:

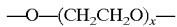

where x is from 10 to 100. Ethylene oxide incorporation into propylene oxide based polyols is well known in the industry. Such incorporation may occur either through a block co-polymer structure, a tapered concentration block, or by random incorporation into the entire polymer chain. Tapered and block incorporation of EO onto PO chains are preferred. Most preferred is incorporation of EO into well defined structural blocks. Incorporation of EO on to PO polymers from 7 percent to 50 percent by weight is preferred. More preferred is 30 percent to 45 percent incorporation of EO.

Diisocyanates include aromatic, aliphatic, and cycloaliphatic diisocyanates and combinations thereof. Representative examples of these preferred diisocyanates can be found in U.S. Pat. Nos. 4,385,133; 4,522,975; and 5,167,899, which teachings are incorporated herein by reference. Preferred diisocyanates include 4,4'-diisocyanatodiphenylmethane, p-phenylene diisocyanate, 1,3-bis (isocyanatomethyl)-cyclohexane, 1,4-diisocyanato-cyclohexane, hexamethylene diisocyanate, 1,5-naphthalene diisocyanate, 3,3'-dimethyl-4,4'-biphenyl diisocyanate, 4,4'-diisocyanato-dicyclohexylmethane, and 2,4-toluene diisocyanate. More preferred are 4,4'-diisocyanato-dicyclohexylmethane and 4,4'-diisocyanato-diphenylmethane. Most preferred is 4,4'-diisocyanatodiphenylmethane.

The starting materials are used in amounts effective to produce an extrudable or injection moldable TPU or TPUU, preferably a TPU, with a melting point maximum as measured by differential scanning calorimetry of at least 120° C., preferably at least 150° C., and more preferably at least 160° C., and not more than 230° C., and preferably not more than 210° C. The TPU or TPUU is also characterized by having a Shore D hardness of not more than 75 and/or a $T_g$ of less than 25 C., preferably a Shore D hardness of not more than 75 and a $T_g$ of less than 25° C. The TPU or TPUU is further characterized by having a total optical transmission rate of at least 50 percent, or a tensile strength of at least 800 psi, or both, preferably both.

The TPU or TPUU of the present invention contains structural units of two chain extenders. The first chain extender is ethylene glycol, diethylene glycol, or 1,3-propanediol, and the second chain extender is a diol, a diamine or an amino alcohol characterized by having a molecular weight of not more than 400 Daltons. The second chain extender may also be ethylene glycol, diethylene glycol, or 1,3-propanediol, but must be different from the first chain extender. Thus, the first and second chain extenders can be respectively ethlyene glycol and diethylene glycol; ethylene glycol and 1,3-propanediol; or diethylene glycol and 1,3-propanediol. Other suitable second chain extenders include cyclohexane dimethanol, butanediol, ethylene diamine, 2-methyl, 1,5-pentanediamine, 1,6-hexanediamine, and ethanol amine. When the chain extender is a diol, the resulting product is a TPU. When the chain extender is a diamine or an amino alcohol, the resulting product is a TPUU.

The composition is preferably a TPU that contains structural units of ethylene glycol and diethylene glycol. The mole-to-mole ratio of structural units of ethylene glycol to diethylene glycol is preferably not less than 1:1, more preferably not less than 3:2, and preferably not more than 10:1. The mole-to-mole ratio of the sum of the structural units of ethylene glycol and the diethylene glycol to the structural units of EO or EO-PO is preferably not less than 2:1 and not more than 10:1, more preferably not more than 7:1. The mole-to-mole ratio of the structural units of the diisocyanate to the sum of structural units of the diols is preferably not less than 0.95:1 and not more than 1.10:1.

The molecular weight of the EO or EO-PO is preferably not less than 800, and more preferably not less than 1000 Daltons, and preferably not greater than 10,000, more preferably not greater than 5000, and most preferably not greater than 3000 Daltons. Examples of commercially available EO-PO are VORANOL™ polyols (a trademark of The Dow Chemical Company) and POLYG 55-56 polyol (a trademark of Arch Chemical). The TPU or TPUU can be manufactured by processes commonly used to make these polymers. The TPU or TPUU product can be prepared by compression molding, injection molding, extrusion, and other methods known generally to those skilled in the art.

It has been surprisingly discovered that a TPU or TPUU having a total optical transmission rate of at least 50 percent, more preferably at least 70 percent, and most preferably at least 80 percent, as measured in accordance with ASTM E179 and E805, and a tensile strength of at least 800, preferably at least 1500, more preferably at least 2000, more preferably at least 2500 psi, and most preferably at least 3000 psi, can be prepared from EO or EO-PO, and the chain extenders described herein.

The TPU or TPUU of the present invention is useful, for example, as a coating, a film, or a sealant, as well as in a variety of articles including cast articles, injection molded articles, and extruded articles, such as shoe soles, hose jacketing, tubing, castor wheels, and as a barrier layer for hospital gowns.

The following examples are for illustrative purposes only and are not intended to limit the scope of this invention. All percentages are in weight percent unless otherwise noted.

EXAMPLES

The diisocyanate used in each example was ISONATE 125M MDI (a trademark of The Dow Chemical Company, 4,4'-diisocyanatodiphenylmethane). The mole:mole ratio of the diisocyanate to the total moles of diol was 1.03:1. The EO-PO was POLYG 55-56 polyol (MW of 2021, 40 percent EO-capped EO-PO). Stannous octoate catalyst was used at a level of 0.02 percent, IRGANOX 1010 antioxidant (a trademark of Ciba-Geigy) was used at a level of 0.2 percent, and ADVAWAX 280 wax was used at a level of 0.25 percent. The melting point refers to the maximum melting point determined by differential scanning calorimetry at 10 C.°/min.

The components were dried and directly injected into the feed throat of a twin screw extruder and allowed to fully react at temperatures up to 220° C. The extrudate was subsequently cast onto a water cooled moving belt and allowed to cool. The end of the belt fed directly to an automated pellet chopping machine from which material was dried prior to processing. The samples were produced by cutting tensile bars from injection molded plaques.

EXAMPLES 1–10

In these examples, the properties of which are illustrated in Table 1, EG:DEG represents the mole-to-mole ratio of ethylene glycol to diethylene glycol; HS:SS refers to the mole-to-mole ratio of hard segment to soft segment, namely, the mole-to-mole rato of the sum of ethylene glycol and diethylene glycol to EO-PO. Trans refers to percent total transmission, Shore A refers to Shore A hardness as measured with a PTC Instruments Model 306L durometer, Tensile refers to tensile strength in psi and (MPa), Elong refers to percent elongation, 100 percent M and 300 percent M refer respectively to modulus at 100 Percent and 300 percent in psi and (MPa). Total light transmittance (the ratio of total light flux through a sample and the amount of light incident on a sample) was measured on a Hunterlab Ultrascan Sphere Spectrocolorimeter (Hunter Associates Reston, Va.) in transmission mode with the sample placed at the entrance to the integrating sphere. The instrument was calibrated prior to each use in accord with the instrumental directions. This procedure requires the measurement of total light against air with a light trap, and a reflecting surface located at the perpendicular surface, for total transmittance and total reflectance respectively.

TABLE 1

Properties of TPU Formulations Using EG, DEG, and

| Expt | EG:DEG | HS:SS | Trans | Shore A | Tensile | Elong | 100% M | 300% M |
|---|---|---|---|---|---|---|---|---|
| 1 | 4.5 | 5 | 73 | 86 | 3248 (22.4) | 558 | 1093 (7.5) | 1957 (13.5) |
| 2 | 2.73 | 3.59 | 85 | 79 | 2057 (14.2) | 764 | 624 (4.3) | 1042 (7.2) |
| 3 | 2.73 | 6.41 | 76 | 90 | 3370 (23.2) | 452 | 1530 (10.5) | 2581 (17.8) |
| 4 | 6.27 | 3.59 | 78 | 80 | 1330 (9.2) | 598 | 638 (4.4) | 970 (6.7) |
| 5 | 6.27 | 6.41 | 71 | 91 | 2965 (20.4) | 470 | 1931 (13.3) | 2605 (17.9) |
| 6 | 2 | 5 | 83 | 84 | 3311 (22.8) | 580 | 1062 (7.3) | 1929 (13.3) |
| 7 | 7 | 5 | 70 | 87 | 2347 (16.2) | 548 | 1345 (9.3) | 1929 (13.3) |

TABLE 1-continued

Properties of TPU Formulations Using EG, DEG, and

| Expt | EG:DEG | HS:SS | Trans | Shore A | Tensile | Elong | 100% M | 300% M |
|------|--------|-------|-------|---------|---------|-------|--------|--------|
| 8 | 4.5 | 3 | 74 | 72 | 587 (4.0) | 341 | 394 (2.7) | 552 (3.8) |
| 9 | 4.5 | 5 | 63.5 | 91 | 2412 (16.6) | 588 | 1039 (7.2) | 1639 (11.3) |
| 10 | 4.5 | 7 | 65 | 96 | 3268 (22.5) | 451 | 1694 (11.7) | 2683 (18.5) |

EXAMPLE 11

Properties of TPU Sample Prepared Using EG and HQEE

The experimental procedure for Examples 1–10 was repeated, except that the short chain diols constituting the hard segment were EG and HQEE (hydroquinone bis(2-hydroxyethyl) ether, obtained by Aldrich) at an EG:HQEE mole-to-mole ratio of 1:1. The mole-to-mole ratio of the hard segment to soft segment (POLYG 55-56 polyol) was 3:1. The Shore A hardness was 86, the tensile strength was 1014 psi (7.0 MPa), the percent elongation was 266, and the 100 percent modulus was 836 psi (5.8 MPa).

EXAMPLE 12

Properties of TPU Sample Prepared Using EG and PDO

The experimental procedure for Examples 1–10 was repeated, except that the short chain diols were EG and PDO (1,3-propanediol, obtained by Aldrich) at an EG:PDO mole-to-mole ratio of 2:1. The ratio of the hard segment to soft segment (POLYG 55-56 polyol) was 3:1. The Shore A hardness was 79, the tensile strength was 1561 psi (10.8 MPa), the percent elongation was 763, the 100 percent modulus was 522 psi (3.6 MPa), and the 300 percent modulus was 866 (6.0 MPa).

What is claimed is:

1. A thermoplastic polyurethane or thermoplastic polyurethane/polyurea comprising structural units of:
   a) a diisocyanate;
   b) a first chain extender selected from the group consisting of ethylene glycol, diethylene glycol, and 1,3-propanediol;
   c) a second chain extender selected from the group consisting of i) a diol, ii) a diamine, and iii) an amino alcohol and having a molecular weight of less than 400 Daltons, with the proviso that the first chain extender is different from the second chain extender; and
   d) ethylene oxide polyol or ethylene oxide-capped propylene oxide polyol;
   wherein the mole ratio of the first chain extender to the second chain extender is not less than 1:1 and
   wherein the thermoplastic polyurethane or polyurethane/urea has:
      (i) a melting point of not less than 120° C. and not more than 230° C.,
      (ii) a Shore D hardness of not more than 75 or a $T_g$ of less than 25° C.,
      (iii) a total optical transmission rate of at least 50 percent and
      (iv) a tensile strength of at least 800 psi.

2. The thermoplastic polyurethane or polyurethane/urea of claim 1 wherein the first chain extender is ethylene glycol and the second chain extender is selected from the group consisting of diethylene glycol, 1,3-propanediol, cyclohexane dimethanol, butanediol, ethylene diamine, 2-methyl, 1,5-pentanediamine, 1,6-hexanediamine, and ethanol amine.

3. The thermoplastic polyurethane or polyurethane/urea of claim 1 which is a thermoplastic polyurethane which contains structural units of diethylene glycol and ethylene glycol, wherein the ratio of the structural units of ethylene glycol to diethylene glycol is not less than 1:1 and not more than 10:1.

4. The thermoplastic polyurethane of claim 3 wherein the ratio of the sum of the structural units of ethylene glycol and the diethylene glycol to the structural units of ethylene oxide polyol or ethylene oxide-capped propylene oxide polyol is not less than 1:1 and not more than 10:1.

5. A thermoplastic polyurethane or thermoplastic polyurethane/polyurea comprising structural units of:
   a) a diisocyanate;
   b) a first chain extender selected from the group consisting of ethylene glycol, diethylene glycol, and 1,3-propanediol;
   c) a second chain extender selected from the group consisting of:
      i) a diol selected from the group of diols consisting of ethylene glycol, diethylene glycol, 1,3-propanediol and cyclohexane dimethanol,
      ii) a diamine, and
      iii) an amino alcohol
      and having a molecular weight of less than 400 Daltons, with the proviso that the second chain extender is different from the first chain extender; and
   d) ethylene oxide polyol or ethylene oxide-capped propylene oxide polyol; wherein the thermoplastic polyurethane or polyurethane/urea has a melting point of not less than 120° C. and not more than 230° C., a Shore D hardness of not more than 75, a Tg of less than 25° C., a total optical transmission rate of at least 50 percent and a tensile strength of at least 800 psi.

6. The thermoplastic polyurethane of claim 4 which has a tensile strength of at least 2000 psi.

7. The thermoplastic polyurethane of claim 6 which has a melting point maximum of at least 160° C. and not more than 210° C., and a total optical transmission rate of at least 65 percent, wherein a) the ratio of the sum of the structural units of ethylene glycol and the diethylene glycol to the structural units of ethylene oxide polyol or ethylene oxide-capped propylene oxide polyol is not less than 2:1 and not more than 5:1; b) the ratio of the structural units of ethylene glycol to diethylene glycol is not less than 3:2 and not more than 7:1.

8. The thermoplastic polyurethane or polyurethane/urea of claim 1 which contains structural units of ethylene oxide polyol.

9. The thermoplastic polyurethane or polyurethane/urea of claim 1 which contains structural units of ethylene oxide-capped propylene oxide polyol.

10. The thermoplastic polyurethane or polyurethane/urea of claim 1 which contains structural units of ethylene oxide polyol and ethylene oxide-capped propylene oxide polyol.

11. The thermoplastic polyurethane or polyurethane/urea of claim 1 which is a thermoplastic polyurethane which contains structural units of a) 1,3-propanediol and b) ethylene glycol or hydroquinone dimethanol.

12. The thermoplastic polyurethane or polyurethane/urea of claim 1 which is a cast article, an injection molded article, an adhesive, an extruded article, a coating, a film, or a sealant.

13. The thermoplastic polyurethane or polyurethane/urea of claim 12 wherein the article is a shoe sole, a hose jacketing, tubing, castor wheel, a barrier layer for a hospital gown.

* * * * *